United States Patent
Kim et al.

(10) Patent No.: US 11,348,168 B2
(45) Date of Patent: May 31, 2022

(54) FINANCIAL PLANNING ENGINE

(71) Applicant: THE NORTHWESTERN MUTUAL LIFE INSURANCE COMPANY, Milwaukee, WI (US)

(72) Inventors: Audrey Ji-eun Kim, New York, NY (US); Benjamin Michael Bartholomew, Jersey City, NJ (US); Stephany Yerger Kirkpatrick, Los Angeles, CA (US); Thomas Richard Gilmour, Edison, NJ (US)

(73) Assignee: The Northwestern Mutual Life Insurance Company, Milwaukee, WI (US)

( * ) Notice: Subject to any disclaimer, the term of this patent is extended or adjusted under 35 U.S.C. 154(b) by 344 days.

(21) Appl. No.: 15/046,402

(22) Filed: Feb. 17, 2016

(65) Prior Publication Data

US 2016/0247222 A1    Aug. 25, 2016

Related U.S. Application Data

(60) Provisional application No. 62/118,441, filed on Feb. 19, 2015.

(51) Int. Cl.
*G06Q 40/00*    (2012.01)
(52) U.S. Cl.
CPC .................................. *G06Q 40/00* (2013.01)
(58) Field of Classification Search
CPC .... G06Q 40/06; G06Q 30/0215; G06Q 40/00; G06Q 10/0635; G06Q 40/08; G06Q 30/0249; G06Q 30/0279; G06Q 10/04; G06Q 10/06311; G06Q 10/063114
See application file for complete search history.

(56) References Cited

U.S. PATENT DOCUMENTS

| | | | |
|---|---|---|---|
| 7,577,597 B1 * | 8/2009 | Allison | G06Q 20/105 705/40 |
| 7,634,436 B1 * | 12/2009 | Wagner | G06Q 40/00 705/37 |
| 8,024,213 B1 * | 9/2011 | Fano | G06Q 30/0201 705/7.29 |
| 8,301,536 B2 * | 10/2012 | Fulshaw | G06Q 10/10 705/36 R |
| 8,341,063 B1 * | 12/2012 | Cernyar | G06Q 40/06 705/36 R |
| 8,429,051 B1 * | 4/2013 | Samson | G06Q 40/06 705/37 |

(Continued)

*Primary Examiner* — Christopher Bridges
*Assistant Examiner* — Tony P Kanaan
(74) *Attorney, Agent, or Firm* — SmithAmundsen LLC

(57) ABSTRACT

A system and a method are disclosed for generating financial goal packages. Personal and financial information is received from a user. Multiple budgeting strategies are generated based on the received personal and financial information. The budgeting strategies specify an amount of money to be saved by the user every set time period. A selection of a budgeting strategy is received from the user. Multiple goal packages specifying an allocation for the money saved by the user are generated. The multiple goal packages are scored based on the selected budgeting strategy. A goal package is selected based on the scores of each of the goal packages. The selected goal package is displayed to the user via a graphical user interface.

5 Claims, 5 Drawing Sheets

(56) References Cited

U.S. PATENT DOCUMENTS

| | | | | |
|---|---|---|---|---|
| 8,533,092 | B1* | 9/2013 | Burrow | G06Q 40/02 705/37 |
| 8,635,101 | B2* | 1/2014 | Wright | G06Q 40/00 705/37 |
| 8,892,467 | B1* | 11/2014 | Ball | G06Q 40/00 705/37 |
| 9,557,889 | B2* | 1/2017 | Raleigh | H04M 15/46 |
| 9,830,659 | B2* | 11/2017 | Santner | G06Q 40/06 |
| 10,594,870 | B2* | 3/2020 | Satyavolu | H04M 15/8011 |
| 11,244,406 | B1* | 2/2022 | Lopez | G06Q 40/12 |
| 2002/0138386 | A1* | 9/2002 | Maggioncalda | G06Q 40/06 705/36 R |
| 2003/0028466 | A1* | 2/2003 | Jenson | G06Q 40/06 705/36 R |
| 2005/0004856 | A1* | 1/2005 | Brose | G06Q 40/08 705/35 |
| 2005/0027572 | A1* | 2/2005 | Goshert | G06Q 40/08 705/4 |
| 2006/0149651 | A1* | 7/2006 | Robinson | G06Q 40/06 705/35 |
| 2007/0011071 | A1* | 1/2007 | Cuscovitch | G06Q 40/00 705/35 |
| 2007/0244777 | A1* | 10/2007 | Torre | G06Q 40/00 705/35 |
| 2007/0250427 | A1* | 10/2007 | Robinson | G06Q 40/06 705/36 R |
| 2009/0281959 | A1* | 11/2009 | Abidi | G06Q 40/06 705/36 R |
| 2010/0100470 | A1* | 4/2010 | Buchanan | G06Q 10/10 705/35 |
| 2010/0125473 | A1* | 5/2010 | Tung | H04L 67/1002 709/200 |
| 2010/0268629 | A1* | 10/2010 | Ross | G06Q 10/10 705/35 |
| 2010/0280935 | A1* | 11/2010 | Fellowes | G06Q 40/00 705/35 |
| 2011/0087622 | A1* | 4/2011 | Padgette | G06Q 10/06 705/36 R |
| 2013/0103580 | A1* | 4/2013 | Ventura | G06Q 40/12 705/40 |
| 2013/0198111 | A1* | 8/2013 | DiCastri | G06Q 40/06 705/36 R |
| 2013/0226836 | A1* | 8/2013 | Senoski | G06Q 40/10 705/36 T |
| 2013/0282542 | A1* | 10/2013 | White | G06Q 40/00 705/35 |
| 2014/0075004 | A1* | 3/2014 | Van Dusen | G06Q 30/0201 709/223 |
| 2015/0073952 | A1* | 3/2015 | Ventura | G06Q 40/12 705/30 |
| 2015/0262307 | A1* | 9/2015 | Krueger | G06Q 40/06 705/36 R |
| 2015/0278957 | A1* | 10/2015 | Wiwi | G06Q 40/10 705/36 R |
| 2016/0027102 | A1* | 1/2016 | Smith | G06Q 40/00 705/35 |
| 2016/0063445 | A1* | 3/2016 | Feinschreiber | G06Q 40/08 705/4 |
| 2016/0063632 | A1* | 3/2016 | Folk | G06Q 40/06 705/36 R |
| 2016/0117773 | A1* | 4/2016 | Lin | G06Q 40/06 705/36 R |
| 2019/0147529 | A1* | 5/2019 | Wright | G06Q 40/06 705/36 R |
| 2022/0044204 | A1* | 2/2022 | Cella | G06N 3/08 |

\* cited by examiner

FINANCIAL PLANNING ENGINE

CROSS REFERENCE TO RELATED APPLICATIONS

This application claims the benefit of U.S. Provisional Application No. 62/118,441, filed Feb. 19, 2015, which is incorporated by reference in its entirety.

BACKGROUND

Field of Art

The disclosure generally relates to the field of financial planning, and more specifically to generating financial goal packages based on user's personal and financial information.

Description of the Related Art

Financial planning applications provide information for users to achieve financial goals such as saving money to purchase a house or saving money for retirement. Given a financial goal, a financial planning application determines an amount of money to be saved every set amount of time (e.g., every month or every pay check cycle) to achieve the financial goal.

These financial planning applications oftentimes determine a savings schedule for achieving the financial goal but do not determine whether the savings schedule is feasible or suitable for the user given the user's finances. That is, the financial planning application may not consider the user's salary or expenses to determine the savings schedule for achieving the financial goal.

Furthermore, users may have multiple financial goals they want to achieve. For example, a user may want to save money to buy a house, send the user's kids to college, and to have a certain amount of money for retirement. The financial planning application may determine a savings schedule for each financial goal individually but does not consider the financial goal in combination with one another.

SUMMARY

Embodiments of the present disclosure provide a financial planning application. The financial planning application receives personal and financial information from a user and generates multiple budgeting strategies based on the received personal and financial information. The budgeting strategies specify an amount of money to be saved or set aside by the user every time period to fund the user's financial goals. For instance the budgeting strategies are based on the user's income and expenses. The generated budgeting strategies may include a conservative budgeting strategy, a moderate budgeting strategy, and an aggressive budgeting strategy. A conservative budgeting strategy may allow the user to set aside money to fund the user's financial goals without making cuts in the user's expenses. Alternatively, a user may have to make cuts the user's expenses to set money aside using the aggressive budgeting strategy. The user then selects one budgeting strategy from the generated budgeting strategies.

To generate the budgeting strategies, a saving potential of the user is determined. The savings potential represents an amount of money that the user can set aside based on the user's expenses. A determination is made whether the saving potential is larger than an upper threshold value. If the saving potential is larger than the upper threshold value, the budgeting strategies are generated based on a first budgeting plan. Otherwise, if the saving potential is smaller than the upper threshold value, a determination is made whether the user's income is larger than a low-income threshold value. If the user's income is lower than the low-income threshold value, an error message is displayed. Otherwise, if the user's income is larger than the low-income threshold value, a determination is made whether the saving potential is larger than a lower threshold value. If the saving potential is larger than the lower threshold value, the budgeting strategies are generated based on a second budgeting plan. Otherwise, if the saving potential is smaller than the lower threshold value, the budgeting strategies are generated based on a third budgeting plan.

The financial planning application also generates multiple goal packages, each goal package having one or more financial goals. To generate the multiple goal packages, multiple goals are generated based on the personal and financial information received from the user. The generated goals are then permuted to generate the multiple goal packages. A score is determined for each of the generated goal packages. For instance, to determine the score of a goal package, a determination is made whether each of the goals of the goal package are feasible based on the selected budgeting strategy. If a goal of a goal package is determined not to be feasible, the goal is relaxed. To relax the goal, the goal amount may be reduced or a goal date may be increased.

A goal package is selected and displayed to the user via a graphical user interface. For instance, a goal calendar illustrating how the amounts saved for each of the goals increase over time and when a user can safely contribute to goals while maintaining other payment obligations is shown via the graphical user interface.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Financial Planning System Architecture

Figure 1:
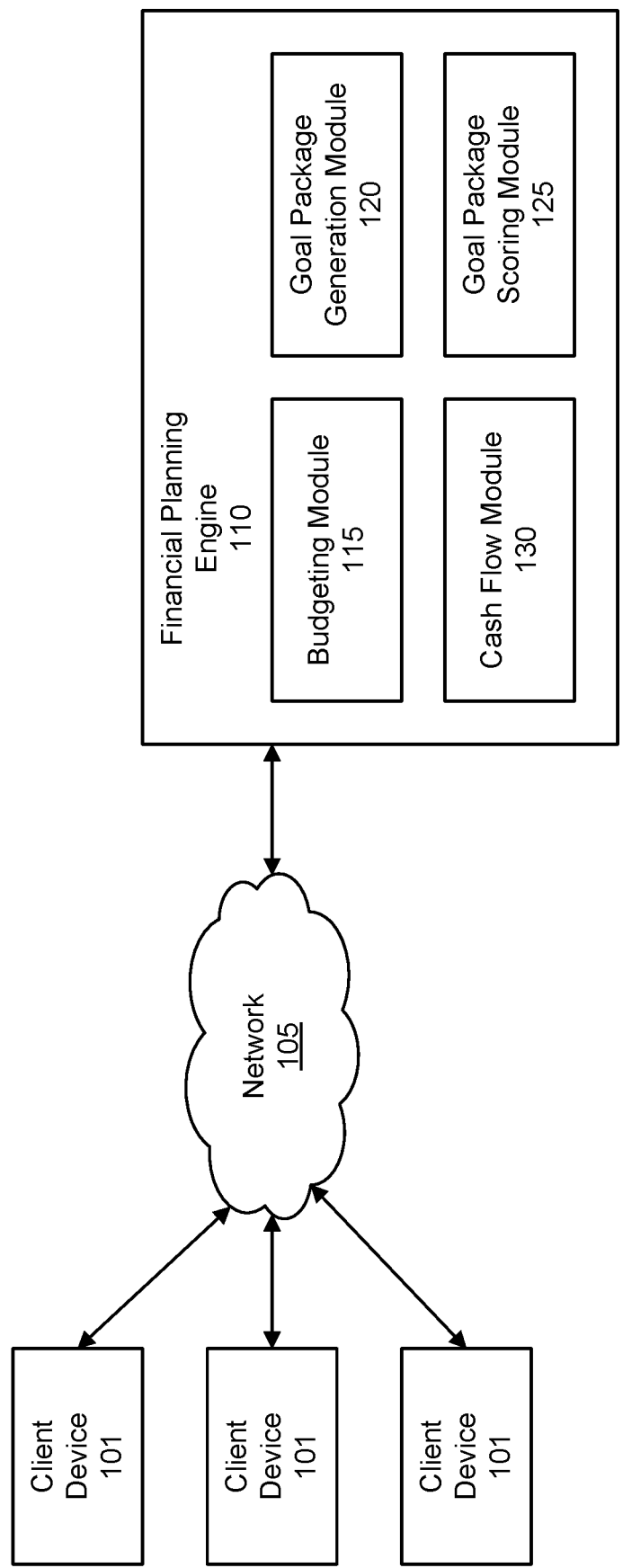
FIG. 1 illustrates an operating architecture of the financial planning engine, according to one embodiment.

FIG. 1 illustrates the operating architecture of the financial planning engine, according to one embodiment. In the embodiment shown by FIG. 1, the operating architecture includes client devices 101, a network 105, and the financial planning engine 110. In other embodiments the operating architecture may include different and/or additional components.

The financial planning engine 110 generates a financial plan for users to achieve one or more financial goals. For instance, the financial planning engine 110 generates a financial plan for a user to save money to purchase a house, pay for a children's school tuition, or pay off the user's credit card debt. The financial planning engine 110 determines one or more budgeting strategies to be selected by the user and generates one or more goal packages that can be achieved with the user-selected budgeting strategy.

The client devices 101 are computing devices having data processing and data communication capabilities that communicate with financial planning engine 110. Examples of client devices 101 include desktop computers, laptop computers, portable computers, personal digital assistants (PDAs), smart phones, or any other device including computing functionality and data communication capabilities. A client device 101 communicates with other client devices 101 and/or with the financial planning engine 110 via the network 105.

Interactions between a client device 101 and the financial planning engine 110 are typically performed via the network 105, which enables communication between a client device 101 and the financial planning engine 110. The network 105 may include links using technologies such as Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc. The network 105 may also utilize dedicated, custom, or private communications links. The network 105 may comprise any combination of local area and/or wide area networks, using both wired and wireless communication systems.

Financial Planning Engine

The financial planning engine 110 receives financial information from a user and generates a financial plan based on the user's financial needs and/or goals. The financial planning engine 110 includes a budgeting module 115, a cash flow module 130, a goal package generation module 120, and a goal package scoring module 125.

Figure 2:
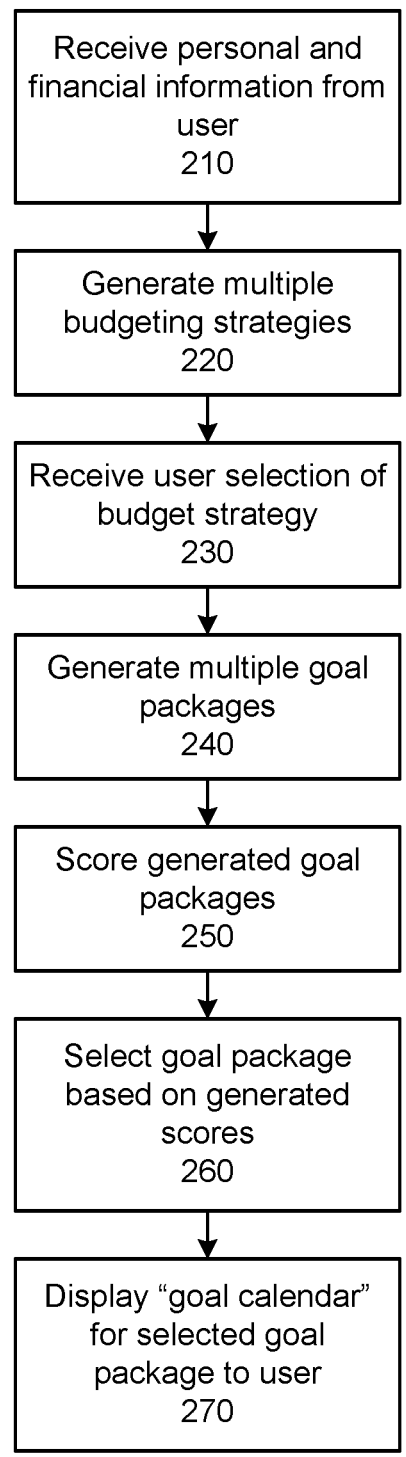
FIG. 2 illustrates a flow diagram of a financial planning engine, according to one embodiment.

FIG. 2 illustrates a flow diagram for generating a financial plan, according to one embodiment. The financial planning engine 110 receives 210 personal and financial information from a user. The financial planning engine 110 may receive personal information such as the name of the user, the age of the user, the marital status of the user, and the planned retirement age of the user. The financial planning engine 110 may also receive personal information such as a list and amount of the user's assets and liabilities. In some embodiments, the list and amount of the user's assets and liabilities are received from financial institutions where the user has accounts. For instance, the balance of a savings and/or checking account may be received from the user's bank, the balance of a credit card may be received from a financial institution that issued the credit card, or a balance of a mortgage loan may be received from a financial institution that originated the loan.

In some embodiments, the user provides the financial engine 110 information regarding the user's accounts in various financial institutions (e.g., name of the financial institution, account number, online account user name and password, and/or answers to security questions used by the financial institutions). The financial engine 110 then retrieves accounts information (e.g., balance, interest rate, transactions) directly from the financial institutions (e.g., via application program interfaces (APIs) offered by the financial institutions), or may use a third party service that retrieves the accounts information from the financial institutions.

Rather than account for income and outflow as general monthly expenses, these may be represented by cash flows occurring on specific days. Cash flows may be represented as individual cash payments. For instance, a user's salary is represented as positive cash flows occurring on specific dates, such as every other Friday, and bill payments are represented as negative cash flows occurring every month when the bill is due.

Based on the received personal and financial information, multiple budgeting strategies are generated 220 for the user to select. The budgeting strategies specify an amount of money to be saved or set aside by the user every time period (e.g., every month or every pay period) to fund the user's financial goals. The generated budgeting strategies may include a conservative budgeting strategy, a moderate budgeting strategy, and an aggressive budgeting strategy. The description of the process for generating the budgeting strategies is described below in conjunction with FIG. 3 and the description of the budgeting module 115.

The generated budgeting strategies are sent to the user and a selection of a budgeting strategy is received 230 from the user. In some embodiments, the financial planning engine 110 displays a message to the user if the selected budgeting strategy requires the user to reduce their discretionary fixed costs.

Based on the selected budgeting strategy, multiple goal packages are generated 240 and the generated multiple goal packages are scored 250. Each goal package describes a group of financial goals to be funded using the money saved or set aside by the user. Each goal package includes one or more financial goals that are generated based on information received from the user. The description of the process for generating and scoring the goal packages is described below in conjunction with FIG. 4 and the description of the goal package generation module 120 and the goal package scoring module 125. A goal package is selected 260 among the multiple goal packages generated by the goal package generation module 120 based on the generated scores. In some embodiments, the generated goal packages and scores are displayed to the user, and the user selects the goal package that best suits the user's preferences. In one embodiment, only a threshold number of goal packages with the highest scores are presented to the user for selection. For instance the three goal packages with highest scores are presented to the user and the user selects one of the presented goal packages. In other embodiments, the financial planning engine 110 selects the goal package with the highest score.

A goal calendar for the selected goal package is displayed 270 to the user. The goal calendar shows the user how to manage their finances to in order to achieve all the goals of the goal package and the timeline for achieving each of the goals of the goal package. In some embodiments, the goal calendar illustrates how each goal will be funded over time.

The goal calendar may also illustrate the cash inflows and outflows of the user over time. For instance, the goal calendar illustrates when the user is expected to receive income from the user's employer and when the user is expected to pay for a utility bill. The goal calendar may also illustrate how the amounts saved for each of the goals increase over time and when a user can safely contribute to goals while maintaining other payment obligations.

Referring back to FIG. 1, the budgeting module 115 generates multiple budgeting strategies based on the user's savings potential. A budgeting strategy describes an amount of money that is set aside from the user's monthly income to fund the user's financial goals. A savings potential describes an amount of money that a user can set aside to fund goals without making any cuts to the user's expenses. For instance, the budgeting module may generate three different budgeting strategies (e.g., one conservative budgeting strategy, one moderate budgeting strategy, and one aggressive budgeting strategy). The budgeting module 115 may determine whether the user's savings potential allows the user to set aside enough money to fund the user's financial goals without making cuts in the user's expenses. If the budgeting module 115 determines that the user's saving potential allows the user to set aside enough money to fund the user's financial goals without making cuts in the user's expenses, the budgeting module 115 may generate budgeting strategies using a first plan. Otherwise, the budgeting module 115 may generate budgeting strategies using a second plan. In some embodiment, the budgeting module 115 may generate budgeting strategies using three or more plans, each plan using larger expense cuts to set aside money to fund the user's financial goals.

Figure 3:
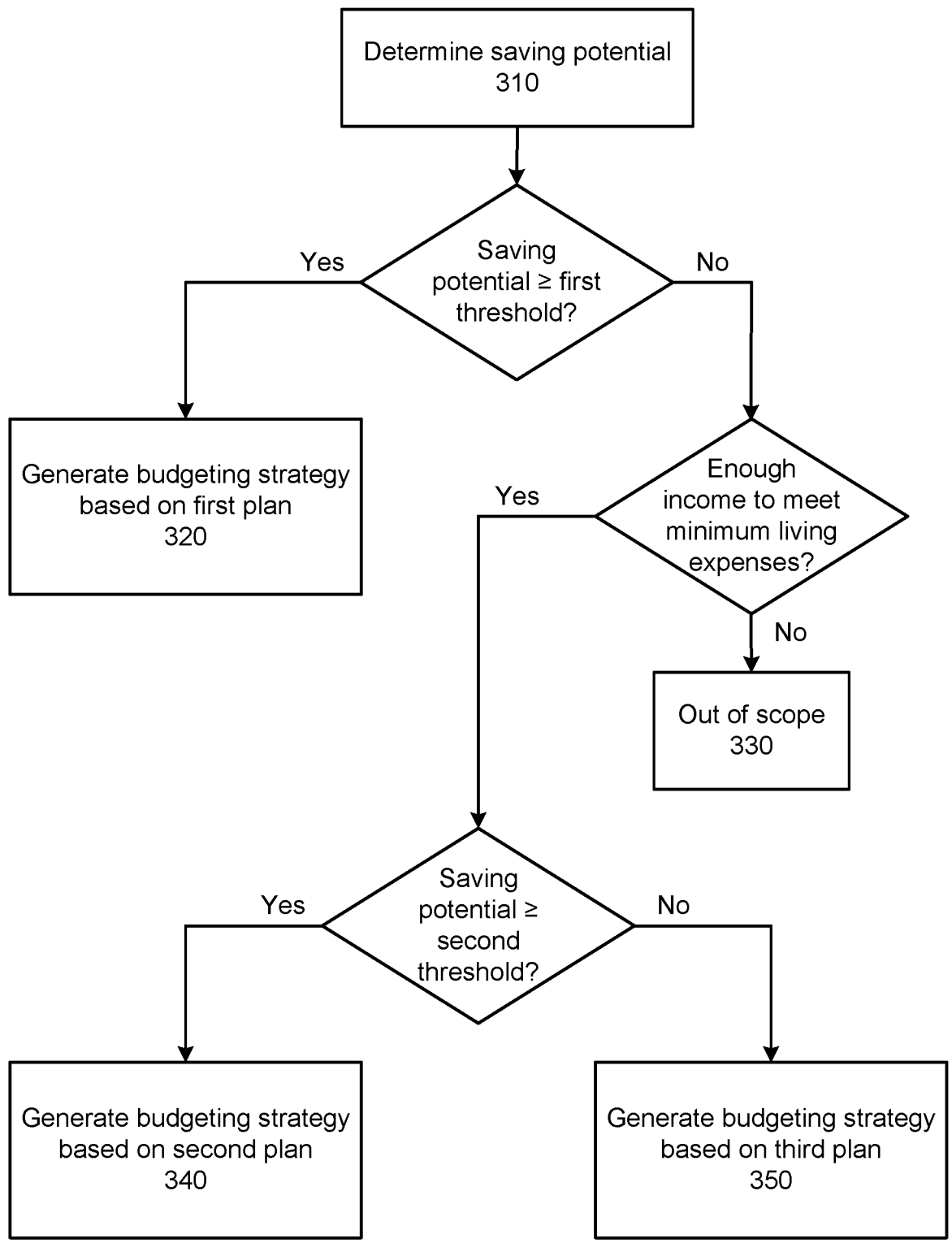
FIG. 3 illustrates a flow diagram of a method for generating budgeting strategies, according to one embodiment.

FIG. 3 illustrates a flow diagram for generating budgeting strategies, according to one embodiment.

The budgeting module 115 determines 310 a saving potential for the user based on received financial information for a user. For instance, the savings potential (SP) may be determined as:

$$SP = Income - \Sigma(\text{Minimum debt payment}) - \text{COL kernel} - \text{Housing kernel} - \text{Discretionary fixed costs} + \text{Retirement contributions}$$

where minimum debt payment is the minimum monthly payments for each of the user's debt accounts (e.g., minimum monthly credit card payment), COL kernel or cost of living kernel is the cost of maintaining a certain standard of living (e.g., cost of food, transportation), housing kernel is the cost of the user's housing (e.g., monthly rent), discretionary fixed costs are other fixed expenses incurred by the user that exclude basic cost of living and housing expenses (e.g., monthly bill for cable television), and retirement contributions are the user contributions to a retirement account (e.g., 401(k) plan or an individual retirement account IRA).

The budgeting module 115 determines whether the saving potential is larger than a first threshold value (e.g., an upper threshold value). The first threshold value may be dependent on the after tax income of the user. For instance, the first threshold may be 8% of the after tax income of the user. If the saving potential is greater than the first threshold, the budgeting module 115 generates 320 budgeting strategies based on a first plan. For instance, the first plan may generate three budgeting strategies (SR1, SR2, and SR3) as:

$$SR1 = Max(8\% \text{ After tax income}, \text{current saving rate})$$

$$SR2 = SR1 + Max(20\% (SP-SR1), 2\% \text{ After tax income})$$

$$SR3 = SR1 + Max(40\% (SP-SR1), 4\% \text{ After tax income})$$

If the saving potential is lower than the first threshold, the budgeting strategy module 115 determines whether the user has enough income to meet minimum living expenses. To determine if the user has enough income to meet minimum living expenses, the budgeting strategy module 115 may compare the user's income to a low-income threshold value. For instance, the budgeting strategy module 115 determines whether the sum of the minimum debt payments, the cost of living (COL) kernel, and the housing kernel is lower than 95% of the user's after tax income. If the user does not have enough income, a budgeting strategy is not generated 330; otherwise, the budgeting module 115 determines whether the saving potential is greater than a second threshold. The second threshold may, for example, be 2% of the user's after tax income. If the saving potential is greater than the second threshold, the budgeting module 115 generates 340 budgeting strategies based on a second plan. For instance, the second plan may generate three budgeting strategies (SR1', SR2', and SR3') as:

$$SR1' = SP$$

$$SR2' = SR1' + 2\% \text{ After tax income}$$

$$SR3' = SR1' + 4\% \text{ After tax income}$$

Since budgeting strategies SR2 and SR3 are larger than the user's saving potential, the user would need to reduce their discretionary fixed costs to implement budgeting strategies SR2' or SR3'.

If the saving potential is lower than the second threshold (e.g., a lower threshold value), the budgeting module 115 generates 350 budgeting strategies based on a third plan. For instance, the third plan may generate three budgeting strategies (SR1", SR2", and SR3") as:

$$SR1'' = 1\% \text{ After tax income}$$

$$SR2'' = 3\% \text{ After tax income}$$

$$SR3'' = 5\% \text{ After tax income}$$

If the saving potential of the user is lower than 2% of the after tax income, the user may need to reduce their discretionary fixed costs to implement the budgeting strategies generated by the budgeting module 115.

The cash flow module 130 determines a projected cash flow for the user. The cash flow module 130 determines a projected after-tax income and a projected cash outflow.

To determine the projected after-tax income, the cash flow module 130 determines characteristics of the cash inflows that affect tax treatment. The cash flow module 130 determines whether a cash inflow is an active (earned) income or passive (unearned) income. The cash flow module 130 also determines whether a cash inflow is taxable or tax-free. If a cash inflow is taxable, the cash flow module 130 estimates an amount of taxes that could be paid for the cash inflow and deducts the tax amount from the gross value of the cash inflow. Additionally, the cash flow module 130 determines a frequency and likelihood of the cash inflow. In some embodiments, if the frequency of a cash inflow is below a threshold (e.g., less frequently than quarterly) or the likelihood is below a threshold value, the cash inflow can be excluded from the cash flow projections. This permits the planning to exclude those payments that are speculative and non-recurring and provide more conservative estimates.

In some embodiments, the characteristics of the cash inflows are specified by the user. These characteristics may describe the treatment of the income (e.g., for tax purposes), whether it will repeat (and at what frequency) and the likelihood of its occurrence, among others. For instance, the user specifies that cash inflows due to salary are active income, taxable, have a biweekly frequency, and a likelihood of 1. In another example, the user specifies that the cash inflow due to rent income are passive income, taxable, have a monthly frequency, and a likelihood of 0.50. In other embodiments, certain characteristics are determined by the cash inflow module 130, and other characteristics are specified by the user. For instance, the cash flow module 130 determines whether a cash inflow is an active or passive income, and whether the cash inflow is taxable; and the user specifies the frequency and likelihood of the cash inflow.

The cash flow module 130 may also account for inflation for at least a portion of the current cash flow when calculating a cash flow projection for the user. For instance, the cash flow module 130 may increase active income by 25% every 5 years. In some embodiments, the cash flow module 130 only inflates the cash inflow for a set amount of time (e.g., for a set time period or until the user reaches a set age). For instance, the cash flow module 130 inflates the cash inflow until the user reaches the age of 50.

In some embodiments, for cash inflows that have a tax withholding, the cash flow module 130 requests the user to provide the gross amount (i.e., amount before the tax withholdings), the pre-tax deductions, the amount withheld, and the take-home pay.

To determine the projected cash outflow, the cash flow module 130 determines the amount of uncompressible cash outflows and the amount of compressible cash outflows. Uncompressible cash outflows are costs incurred by the user that cannot be reduced, while compressible cash outflows are costs incurred by the user that can be reduced. The value of some uncompressible cash outflows may be determined or estimated by a third party entity or agency (e.g., the U.S. Bureau of Labor Statistics). Alternatively, the uncompressible cash outflows may be set by minimum payments the user has to make in some of the user's accounts. Uncompressible outflows include cost of living (COL) kernel, housing kernel, and minimum debt payments. Compressible outflows include retirement contributions, discretionary fixed expenses, and discretionary flex expenses.

The COL kernel and the housing kernel may be determined based on the user's household composition (e.g., number of adults and children in the user's household). The COL kernel may additionally be based on information from external sources (e.g., information from the Bureau of Labor Statistics). In some embodiments, the COL kernel is inflated annually. The minimum debt payment is determined based on the information from the user's debit accounts (e.g., credit card accounts, or loan accounts).

In one embodiment, the retirement contribution cash outflow is automatically generated for a user in addition to other goals the user may have. In one embodiment, the retirement contribution cash outflow starts with the current retirement contribution amount, and is increased by 1% of the user's net income every 6 months. In some embodiments, the cash flow module 130 determines whether the current retirement contribution creates a deficit in the user's budget. If a determination is made that the current retirement contributions create a budget deficit, the retirement contributions are reduced until the budget deficit is eliminated.

The cash flow module 130 determines the discretionary fixed expenses by increasing the user's current discretionary fixed expenses by an annual inflation rate. For instance, the discretionary fixed expenses are increased annually with a rate of 3%. Alternatively, cuts to the discretionary fixed expenses may be suggested to the user in order to increase the saving potential.

The discretionary flex expenses are determined based on a budget strategy selected by the user. The discretionary flex expenses is the unallocated money the user has left after all the other expenses and the savings amount specified by the budgeting strategy has been taken out from the user's income. The generation of budgeting strategies is described in conjunction with the description of the budgeting module 115.

The goal package generation module 120 may generate the retirement goal based on the user's cost of living (COL) expenses, the user's housing costs, the user's annual medical expenses, and the user's fixed costs.

In some embodiments, the COL expenses are adjusted for inflation annually. For instance, the COL expenses are increased with a rate of 3% annually. The cost of housing may be determined based on the user's current cost of housing. Alternatively, the user may specify a change in the cost of housing or a change in housing type (e.g., user may move in with to the user's children's house, the user may move to an elderly care facility, or the user may plan to buy a house before retirement). This change may be to the current expected cost of housing, or may designate a desired change in the future. The financial planning engine may also determine the cost of living based on one or more goals of the user. For instance, if one of the goals of the user is to purchase a house, the financial planning engine may determine the cost of housing based on a mortgage payment amount for the house, a real estate tax amount, and/or house insurance cost for the house associated with the user's goal. In some embodiments, the cost of housing is inflated annually. For instance, the cost of housing is inflated by 3% every year. In other embodiments, the inflation rate of the cost of housing is based on the type of housing of the user. For instance, if the user lives in a house and has a mortgage for the house, the mortgage payments are not inflated annually, but the real estate taxes for the user's house is inflated annually.

In some embodiments, medical expenses are based on the user's age. For instance, the financial planning engine may determine that the medical expenses of the user after retirement and between the ages of 65 and 84 is $6,000, and the medical expenses of the user after the age of 85 is $10,000.

In some embodiments, the other fixed costs are determined based on the user's current fixed costs. In some embodiments, the fixed costs are inflated annually (e.g., inflated 3% annually). The retirement needs are then determined based on the determined cost of living, the determined cost of housing, the determined annual medical expenses, and the determined other fixed costs.

The goal package generation module 120 may generate one or more goals based on information received from a user. For instance, the goal package generation module 120 may generate a retirement goal, an emergency savings goal, a housing goal, a child education goal, an adult education goal, and/or a family growth goal. A goal includes at least a goal amount and a completion date. In some embodiments, a goal may include a maximum and minimum value for the goal amount and/or completion date. These various goals may be specified by the user, or the user may provide information to the goal package generation module 120, which assists in determining the various parameters for a goal, such as minimum and maximum values for the goal. Some of these goals are described below. The expenses listed above, if they occur in the future, may also be modeled as goals. For example, while retirement savings is treated above as an expense, it may also be treated as a goal in some embodiments.

The goal package generation module 120 may generate the emergency savings goal based on a goal amount specified by the user. In other embodiments, the amount associated with the emergency savings is based on the user's current salary. In some embodiments, if the user has multiple sources of income (e.g., income from two different jobs, and/or income from the user and the user's spouse) the amount associated with the emergency savings is based on the largest source of income. In some embodiments, the user's income for determining an amount of the emergency savings goal is an average monthly salary over a set amount of time (e.g., over one year). In some embodiments, windfall income (e.g., bonuses or any unexpected income) is excluded from the calculation.

The goal package generation module 120 may generate multiple emergency savings goals (e.g., one conservative goal and one aggressive goal). For instance the goal package generation module 120 may generate a first goal with a goal amount of one month of the user's income; and a second goal with a goal amount of three months of the user's income. In some embodiments, other information may be used to determine the goal amounts. For instance, if the user does not have children under the age of 18 and the user does not own a home, the goal package generation module 120 generates an emergency savings goal with a goal amount of three months of the user's income; and otherwise, generates an emergency savings goal with a goal amount of six months of the user's income.

The goal package generation module 120 may also generate a housing goal based on the cost for the down payment of the house and closing cost for the mortgage of the house. In some embodiments, the amount associated with the housing goal is:

Goal Amount=Down Payment+Closing Cost−Proceeds from sale

In some embodiments, the goal package generation module 120 receives a target value of a house the user would like to purchase and a target date for the purchase of the house. The goal package generation module 120 determines a down payment value based on the target value of the house. For instance, the goal package generation module 120 may determine the down payment value as 20% of the target value of the house. Additionally, the goal package generation module 120 determines the closing cost based on the target value of the house. For instance, the goal package generation module 120 may determine the closing cost as 3% of the target value of the house.

In some embodiments, for goal packages that include a housing goal, the user's fixed expenses are increased by a projected PITI (principal, interest, taxes, and insurance) payment amount after the target purchase date. In other embodiments, the user's housing kernel is changed to the PITI payment amount. For instance, if the user currently rents an apartment, the user's housing kernel is changed from the current cost to rent the apartment to the projected PITI payments. The projected PITI payments may be determined based on the user's credit score and a projected interest rate.

In some embodiments, if the mortgage payments for the housing goal increase the user's debt-to-income ratio (DTI) to be larger than a threshold value, the goal package generation module 120 reduces the target value of the house until the DTI is equal to or lower than the threshold value. For example, if the mortgage payment increases the DTI to be larger than 36%, the goal package generation module 120 reduces the target value of the house until the DTI is substantially equal to 36%.

The goal package generation module 120 may additionally generate child education goals that have an associated amount that includes tuition and living costs. For instance, the amount associated with the child education goal may be:

Education Goal Amount=Tuition+Living Costs

In some embodiments, the goal package generation module receives a selection of whether the user would like to save for a private college or a public college. The goal package generation module may additionally receive the current age of the child, or a target date when the child is expected to attend college. The goal package generation module then determines the cost of tuition and living costs based on the received information. In some embodiments, the user may select to exclude living costs for the child education goal. In this embodiment, the goal package generation module 120 determines the goal amount based on the cost of the tuition.

In some embodiments, the cost of tuition is determined based on the current cost of tuition plus an inflation value based on the number of year left until the target date when the child is expected to attend college. For instance, the tuition is inflated with an annual inflation rate of 6%.

The living costs may be determined based on a current estimated cost of living plus an inflation value based on the number of year left until the target date when the child is expected to attend college. For instance, the goal package generation module may use a current average cost of living for college students and an annual inflation value of 3%.

In some embodiments, the child education goal is generated as multiple annual goals starting the first year the child is expected to attend college and ends the year the child is expected to graduate from college. For instance, four annual goals, one for each year the child is expected to be in college, are generated. The first goal includes the tuition and living cost for the first year of college, and a target date equal to the date the child is expected to start college; the second goal includes the tuition and living cost for the second year of college, and a target date one year after the target date of the first goal; the third goal includes the tuition and living cost for the third year of college, and a target date one year after the target date of the second goal; and the fourth goal includes the tuition and living cost for the last year of college, and a target date one year after the target date of the third goal. In some embodiments, the tuition and living costs for the second, third and fourth goals are adjusted for inflation compared to the tuition and living costs of the first goal.

The goal package generation module 120 may additionally generate an adult education goal for the user's own education to go back to school, for example, to obtain a certification for obtaining a promotion at work. The user specifies the type of school and the timeframe to complete the program. The goal package generation module 120 then determines a goal amount based on the tuition and income replacement for the user for the time the user is attending school. That is, the goal amount for an adult education package is:

Goal Amount=Tuition+Income Replacement

In some embodiments, the income of the user is adjusted after the expected graduation date, to a projected increase in remuneration for having completed the school program. For instance, the income is increase in view of an expected increase in salary due to a promotion.

The goal package generation module 120 may additionally generate a family growth goal to account for lost wages due to maternity leave or paternity leave. The user may specify the paternity and/or maternity leave policy of the user's workplace and the amount of leave the user is expecting to take. The goal package generation module 120 may determine a goal amount as:

Goal Amount=Months_partially_covered×% Income_not_covered+Months_not_covered

Where Months_partially_covered is the number of paternity and/or maternity leave month the user will receive partial compensation, % Income_not_covered is the percentage of the income the user will not receive during the paternity and/or maternity leave month the user will receive partial compensation, and Months_not_covered is the number of paternity and/or maternity leave months the user will not receive compensation.

Figure 4:
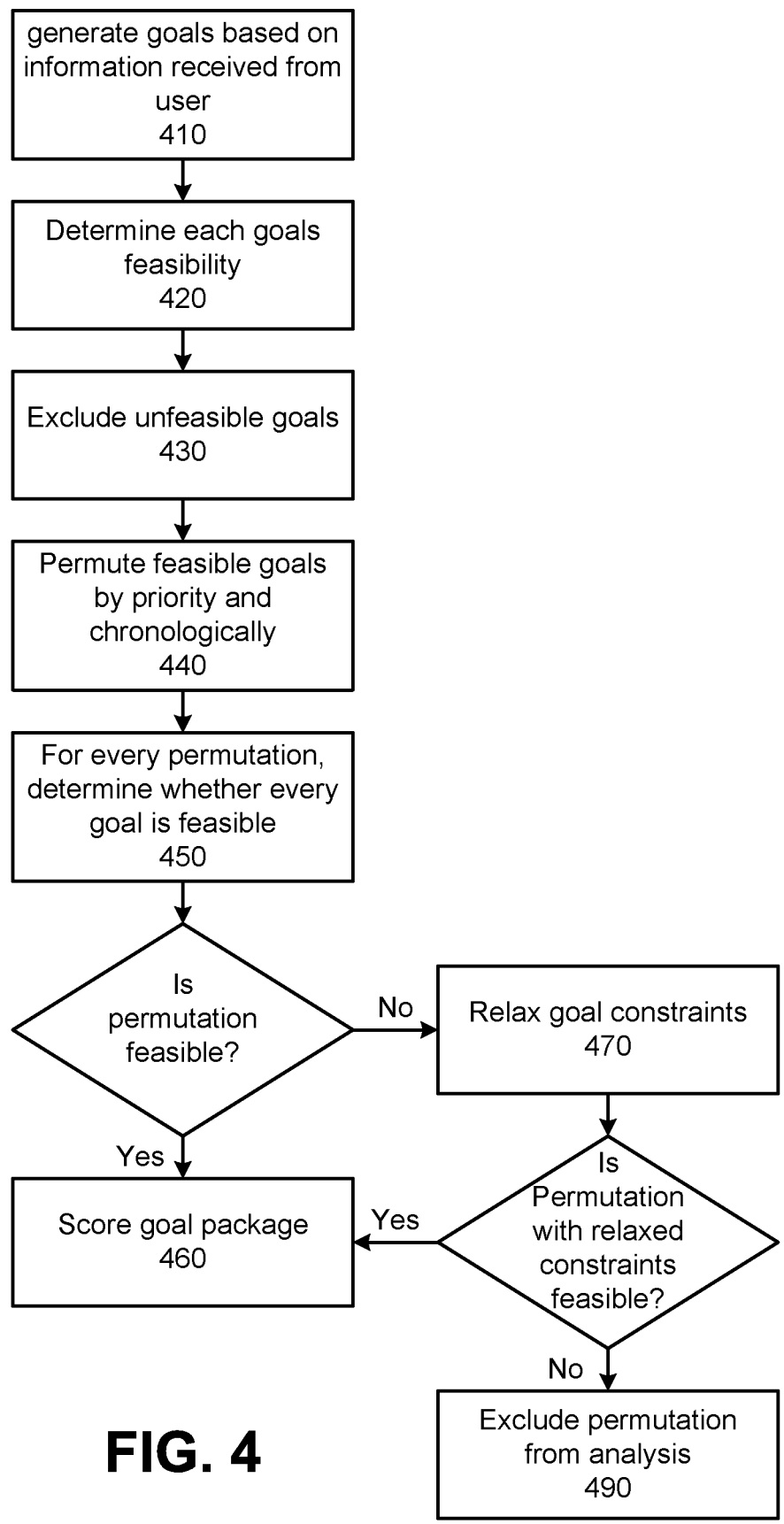
FIG. 4 illustrates a flow diagram of a method for generating financial goal packages, according to one embodiment.

The goal package generation module 120 generates multiple goal packages based on the generated goals. Each goal package reflects, based on a given budget strategy, a set of goals that can be achieved or partially achieved by a budget strategy. FIG. 4 illustrates a flow diagram for generating goal packages, according to one embodiment. The goal package generation module 120 generates 410 goals based on information received from the user. For example, a user may have a first goal ($G_A$) to save for their child's college expenses. Goal $G_A$ may have a value of $100,000, a target date of 7 years into the future, and a high priority. The user may have a second goal ($G_B$) to save for a down payment of a house. Goal $G_B$ may have a value of $300,000 and a target date of 10 years into the future. A third goal (GO may be for a vacation around Europe, may have a value of $5,000, a target date of 2 years into the future, and a medium priority. Other goals may be to pay-off credit cards, save money to establish an emergency saving, etc.

The goal package generation module 120 determines 420 the feasibility of achieving each goal independently of the other goals. That is, the goal package generation module 120 determines whether a goal can be achieved based on the selected budgeting strategy without considering whether other goals could also be achieved. For instance, if a goal has an amount of $100,000 and a target date of 5 years, the goal package generation module 120 determines whether the user can save $100,000 in 5 years by following the selected budgeting strategy.

If the goal package generation module 120 determines that a goal is not achievable, the goal package generation module 120 excludes 430 the unachievable goal from the analysis. In some embodiments, if a goal is not achievable, the goal package generation module 120 determines whether a modified goal is achievable, with either a lower amount or a longer time span compared to the unachievable goal. For example, if the goal package generation module 120 determines that a goal that has associated an amount of $100,000 and a target date of 5 years is not achievable, the goal package generation module 120 determines whether a goal with an amount of $80,000 and a target date of 5 years, or a goal with an amount of $100,000 and a target date of 7 years is achievable. To determine the feasibility of a modified goal, the goal package generation module adjusts the target date or target goal amount. The user or settings may specify that for certain types of goals, the amount should be adjusted before a target date, along with other preferences for achieving modified goal.

The goal package generation module 120 permutes 440 the achievable goals to generate multiple goal packages that reflect achieving one or more goals together. In some embodiments the goal package generation module 120 generates goal packages for all the possible permutations of the achievable goals. In other embodiments, the goal package generation module 120 first generates permutations with 2 achievable goals, and increases the number of goals in the permutation as the goal package generation module 120 finishes analyzing the permutations with lower number of elements. For instance, if a user has 4 achievable goals ($G_A$, $G_B$, $G_C$, and $G_D$), the goal package generation module generates goal packages by generating and analyzing 2 goal permutation of the 4 achievable goals (e.g., [$G_A$, $G_B$], [$G_A$, $G_C$], [$G_A$, $G_D$], [$G_B$, $G_C$], [$G_B$, $G_D$], and [$G_C$, $G_D$]). The goal package generation module then generates and analyzes packages with 3 goals (e.g., [$G_A$, $G_B$, $G_C$], [$G_A$, $G_B$, $G_D$], [$G_A$, $G_C$, $G_D$], [$G_B$, $G_C$, $G_D$]), followed by goal packages with 4 elements (e.g., [$G_A$, $G_B$, $G_C$, $G_D$]).

The goal package generation module 120 determines 450 whether each of the generated goal packages is achievable with the selected budgeting strategy. For instance, the goal package generation module 120 determines whether goal package [$G_A$, $G_B$] is achievable by determining whether both goal $G_A$ and goal $G_B$ are achievable with the selected budgeting strategy.

In some embodiment, if a goal package is not achievable, goal packages that contain all of the goals included in the unachievable goal package are not analyzed. For instance, if goal package [$G_A$, $G_B$] is not achievable, goal packages [$G_A$, $G_B$, $G_C$], [$G_A$, $G_B$, $G_D$], and [$G_A$, $G_B$, $G_C$, $G_D$] are not analyzed.

In some embodiments, if the goal package generation module 120 determines that a goal package is not achievable, the goal package generation module 120 modifies 470 the constraints of one or more goals and determines whether the goal package with modified constraints is achievable. For instance, for a goal package with two goals [$G_A$, $G_B$], the goal package generation module 120 may modify the constraints of goal $G_A$ (e.g., by reducing the associated amount or moving the associated target date forward) to generate modified goal $G_A$ and/or modify goal $G_B$ to generate modified goal $G_B'$ and determine and determine whether a goal package with the modified goals is achievable with the selected budgeting strategy. Goal package generation module 120 may generate modified goal packages [$G_A$, $G_B'$], [$G_A'$, $G_B$], and [$G_A'$, $G_B'$] and determine whether the modified goal packages are achievable. If the modified goal package is not achievable, the modified goal package is excluded 490 from further analysis.

In some embodiments, the modification of the targets of a goal is based on a user input. For instance, a user may specify a goal relaxation limit (e.g., a user may specify that a goal may be modified up to 90% of its target amount, or may be extended for up to one year). In other embodiments, the goals may be modified based on the type of the goal. For instance, the time constraint for saving for college may not be modified, but the associated value may be modified up to 90% of the associated value.

Figure 5:
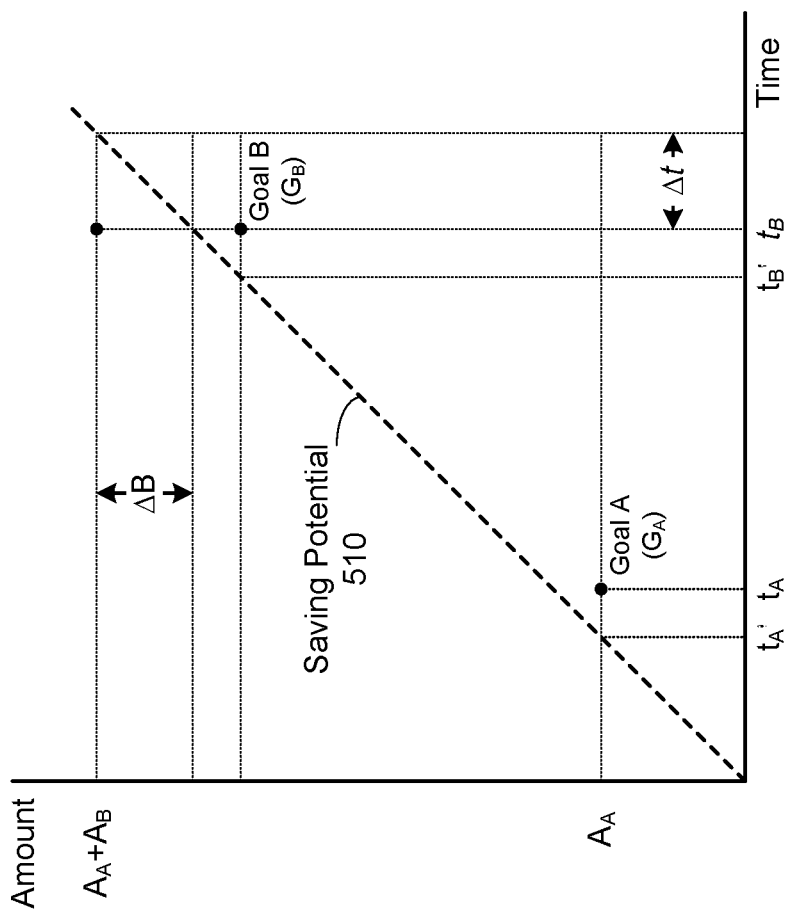
FIG. 5 illustrates a graph for a goal package with two goals, according to one embodiment.

FIG. 5 illustrates a goal package with two goals $G_A$ and $G_B$. Goal $G_A$ has a target amount of $A_A$ and a target time of $t_A$. Goal $G_B$ has a target amount of $A_B$ and a target time of $t_B$. Each goal $G_A$ and $G_B$ is independently achievable. Goal $G_A$ may be achieved within time $t_A'$ and goal $G_B$ may be achieved within time $t_B'$. In order to be able to achieve both goals, the user would have to save a total amount of $A_A+A_B$ within time $t_B$. As illustrated in FIG. 5, point ($t_B$,$A_A+A_B$) is above the saving potential line 5. Thus, both goals are not achievable with the user's budgeting strategy. To achieve both goals, the financial planning engine 110 may modify the constraints of goal $G_B$ to generate a modified goal $G_B'$. For instance, a goal package with a modified goal $G_B'$ that has a target amount of $A_B - \Delta B$ would be achievable with the user's budgeting strategy. Alternatively, a goal package with a modified goal $G_B'$ that has a target date of $t_B - \Delta t$ would also be achievable with the user's budgeting strategy.

In some embodiments, the goal package generation module 120 uses a loan to finance a goal that is not achievable. For instance, the goal package generation module 120 uses a student loan to finance a child education goal. In some embodiments, a user may specify whether a loan can be used to finance a goal. For instance, a user may specify that a loan can be used to finance a child education goal, but a loan cannot be used to finance a vacation goal.

If a loan is used to finance a goal, the financial planning engine modifies the user's cash flow after the target date the loan is obtained. For instance, a minimum debt payment amount is increased and thus, the savings potential of the user may be reduced due to the loan payments.

The goal package scoring module 125 scores 460 the goal packages generated by the goal package generation module 120. The goal package scoring module 125 determines a goal package score based on multiple criteria, which in one embodiment includes achievement quality, risk, and emotional quality. The goal package score may further be based on the user-specified priorities of each of the goals of the goal package (e.g., a penalty based on the user-specified priority is applied to the score of the goal package for goals that are not achieved in the goal package). The goal package scoring module 125 determines a penalty value for each of the criteria used to determine the score. That is, a goal package that does not include the goal with the higher priority is penalized more than a goal package that includes the goal with the higher priority but does not include a goal with a lower priority. For instance, a goal package that does not include the highest priority goal, but includes the second highest priority goal has a higher penalty than a goal package that includes the highest priority goal, but does not include the second highest priority goal.

In some embodiments, the penalties for not achieving a goal increases exponentially with the priority of the goal. In other embodiments, the penalty increases linearly with the priority of the goal. In yet other embodiments, the user may specify a penalty value (e.g., a penalty value between 0 and 1) for not achieving each of the goals.

To determine the penalty value for achievement quality, a penalty value for each goal of the goal package that has one or more modified constraints (e.g., relaxed target amount, or relaxed target date). The penalty determined by the goal package scoring module 125 is based on the difference between the original goal constraints and the modified goal constraints. That is, the determined penalty is based on the reduction of the goal target amount, and/or the increase of the goal target date.

The penalty due to risk may include multiple factors relating to risks associated with how the goal is achieved. One factor included in the risk penalty may be a debt risk penalty. If the goal package includes obtaining debt financing to achieve a goal, a debt risk penalty based on the amount of the debt is determined. Another factor included in the risk penalty may be whether an emergency savings is achievable with the goal package. Another factor included in the risk penalty may be based on expected drawdown of a user's retirement account after retirement, and a risk of depleting the account prematurely.

The penalty due to emotional quality is based on when the first goal is achieved and reflects the emotional satisfaction of having achieved a goal sooner. For instance, a penalty is determined whether the first goal of the goal package is achieved within the first year, within the first two year, within the first 5 years, or after 6 years from starting the start date of the goal package. The emotional quality reflects a preference for achieving a goal from the set of goals earlier in time.

The penalties are aggregated to determine a goal package score. For instance, the penalties are multiplicatively aggregated. In some embodiments, the penalties are weighted. For instance, the achievement quality penalty has a weight of 40%, the risk penalty has a weight of 40%, and the emotional quality penalty has a weight of 20%. Each of the penalties applied to a goal package decreases the score of the goal package. In some embodiments, each penalty is decimal value between 1 and 0. The penalties may be applied as:

$$S'_{goal\ package} = S_{goal\ package} \times P_{achievement} \times P_{risk} \times P_{emotional}$$

where $S'_{goal\ package}$ is the goal package score after applying the penalties, $S_{goal\ package}$ is the goal package score before applying the penalties, $P_{achievement}$ is the achievement quality penalty, $P_{risk}$ is the risk penalty, and $P_{emotional}$ is the emotional penalty.

In some embodiments, the goal package generation module repeats the steps of FIG. 4 using a more aggressive budgeting strategy than the strategy selected by the user and presents the comparison between the goal packages that can be achieved with the budgeting strategy selected by the user and the more aggressive budgeting strategy.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An operating architecture for a financial planning system comprising:
   one or more client devices including at least one smart phone;
   a graphical user interface; and
   a financial planning engine at least indirectly in communications with the one or more client devices by way of a wireless communications system, the financial planning engine configured to cause at least some first information to be displayed at the graphical user interface, the financial planning engine including each of:
      a first hardware module including at least one first processor that includes at least some first dedicated circuitry and at least some first programmable circuitry and configured to operate as a budgeting module;

a second hardware module including at least one second processor that includes at least some second dedicated circuitry and at least some second programmable circuitry and configured to operate as a cash flow module;

a third hardware module including at least one third processor that includes at least some third dedicated circuitry and at least some third programmable circuitry and configured to operate as a goal package generation module; and a fourth hardware module including at least one fourth processor that includes at least some fourth dedicated circuitry and at least some fourth programmable circuitry and configured to operate as a goal package scoring module, wherein the first, second, third, and fourth hardware modules are configured to perform a plurality of operations in a substantially concurrent manner, wherein the at least one first processor, at least one second processor, at least one third processor, and at least one fourth processor are included in a cloud computing environment, wherein the goal package generation module is configured to generate one or more of a plurality of goals at least in part automatically based on received personal and financial information, wherein the goal package generation module additionally is configured to generate a plurality of goal packages by permuting feasible goals, comprising generating a respective goal package for each sub-combination of the feasible goals including a respective plurality of the feasible goals, each goal package including its respective sub-combination of the feasible goals, wherein each of the plurality of goals includes a respective goal amount and a respective goal date, and is of a respective type that is selected from the group consisting of a retirement goal type, a housing goal type, a child education goal type, an adult education goal type, an emergency savings goal type, a family growth goal type, a vacation goal type, and a credit card payment goal type, wherein the goal package scoring module is configured to score each of the generated goal packages at the goal package scoring module based on a selected budgeting strategy, wherein the at least some first information includes a goal calendar for a selected one of the plurality of goal packages, and wherein the goal package scoring module is configured to score each of the generated goal packages at the goal package scoring module at least in part by:

for each of the plurality of goals, determining whether the respective goal is included in the respective goal package; and responsive to determining that the respective goal is not included in the respective goal package, decreasing a respective score of the respective goal package that does not include the respective goal, the decrease in the respective score of the respective goal package based on an importance of the not included respective goal.

2. The operating architecture of claim 1, wherein the goal package generation module further is configured to generate the plurality of goal packages by:

determining whether each of the goal packages is feasible based on the selected budgeting strategy; and responsive to determining that a first goal package of the plurality of goal packages is not feasible, relaxing a goal constraint of the first goal package.

3. The operating architecture of claim 2, wherein the relaxing of the goal constraint comprises reducing the respective goal amount of a first goal of the first goal package.

4. The operating architecture of claim 2, wherein the relaxing of the goal constraint comprises increasing the respective goal date of a first goal of the first goal package.

5. The operating architecture of claim 1, wherein the cash flow module is configured to determine at least one cash flow based on the received financial information, the at least one cash flow including a positive cash flow and a negative cash flow, the positive cash flow and the negative cash flow including an additional amount, a frequency, and a likelihood; and wherein the budgeting strategy is based on the at least one cash flow.

* * * * *